United States Patent [19]
Manjikian et al.

[11] 3,774,771

[45] Nov. 27, 1973

[54] REVERSE OSMOSIS MODULE

[75] Inventors: Serop Manjikian, Del Mar; William K. Windle, Encinitas, both of Calif.

[73] Assignee: The United States of America as represented by the Secretary of the Interior, Washington, D.C.

[22] Filed: Dec. 9, 1971

[21] Appl. No.: 206,469

[52] U.S. Cl.................. 210/321, 210/433, 210/456
[51] Int. Cl............................................. B01d 31/00
[58] Field of Search................... 210/321, 433, 456, 210/490

[56] References Cited
UNITED STATES PATENTS

| | | | |
|---|---|---|---|
| 3,666,109 | 5/1972 | Goeldner | 210/321 |
| 3,612,282 | 10/1971 | Cheng | 210/490 X |
| 3,616,429 | 11/1971 | Mahjikian | 210/456 X |
| 3,608,730 | 9/1971 | Blaha | 210/433 X |

*Primary Examiner*—Frank A. Spear, Jr.
*Attorney*—Frank A. Lupasik and Thomas Zack

[57] ABSTRACT

A reverse osmosis module contains a number of membrane elements each having a semipermeable membrane covered outer surface, and each surrounded by a flow tube for controlling liquid flow over the membrane surface. The membrane elements are enclosed in a pressure resistant container with liquid under pressure filling the space between the outsides of the liquid flow control tubes and the interior surface of the pressure resistant container.

8 Claims, 6 Drawing Figures

REVERSE OSMOSIS MODULE

THE BACKGROUND

1. The Field of the Invention

This invention relates to a module in the form of a pressure resistant container enclosing membrane elements for purifying liquids by a membrane process, for example, reverse osmosis.

2. The Prior Art

Several types of reverse osmosis modules have been used and described in the prior art. These have included plate and frame assemblies for supporting membranes, tubular membranes inside pressure resistant supporting tubes, and spiral wound modules in which the membrane, a product carrier leaf, and a feed solution distribution spacer are wound around each other to form a cylindrical pack. Another type of reverse osmosis module employs membrane elements in which each comprises a porous support tube having a semipermeable membrane helically wound around its outer surface as described and claimed in U.S. Pat. No. 3,578,175. A number of such elements are enclosed inside a pressure container, impure liquid is circulated under pressure over the membrane surfaces, and purified liquid is withdrawn from the interiors of the membrane elements.

Operating efficiency of modules containing elements having external membrane covered surfaces depends, however, largely on the character of liquid flow over the membrane surfaces. The liquid flow should have sufficient turbulence or velocity to provide a washing and cleaning action and to eliminate, or reduce as much as possible, a boundary layer of liquid of high salt concentration adjacent the membrane surface. This liquid flow should be obtained without exhorbitantly high pumping costs, or expensive and intricate module interior components. The basic problem is that a number of tubular membrane elements, no matter how closely clustered inside a tubular pressure vessel, leave so much excess flow area or space that sufficiently high fluid velocity cannot be obtained to maintain desirable flow conditions except at impractically high pumping rates. U.S. Pat. application Ser. No. 119,737, now U.S. Pat. No. 3,698,559, filed Mar. 1, 1971 by Serop Manjikian proposes the use of stuffers or plastic blocks of configuration to fill up the excess space within a circular pressure vessel, and to guide the liquid flow over the membrane surfaces, forming restricted channels so as to insure controlled flow. This design can be successfully employed for certain purposes, such as food processing, where the cost of the module components can be justified and the use of solid inserts would be advantageous.

For applications where large quantities of water must be treated at minimum cost, such as for example purification of brackish water for municipal supply, a simple, low cost module design which would provide desirable fluid control for efficient flow over the membrane surfaces at acceptable pumping rates would be very advantageous.

SUMMARY OF THE INVENTION

Summarized briefly the module of this invention comprises a tubular pressure resistant container in which are arranged a plurality of elongated membrane elements each comprising a permeable support having a semipermeable membrane around its outer surface. Preferably the supports are tubular and the semipermeable membrane is helically wound around the outside of each tube with overlapping adjacent edges sealed with adhesive or a tape wrapping. Liquid flow over the membrane surface is controlled by a flow control tube surrounding each membrane element having an inner surface spaced apart sufficiently from the membrane surface to form a liquid flow channel of advantageous dimensions. The flow control tube is of thin wall construction so as to be economically fabricated.

The space between the outside of the flow control tubes and the interior of the pressure resistant container is filled with liquid at substantially the same pressure as the pressure of feed liquid flowing through the flow channels inside the flow control tubes. Thus the pressures inside and outside the flow control tubes are substantially balanced. A port is provided to transfer feed liquid from the inside of at least one flow control tube to the space outside it to enable this space to be filled with liquid, and means are provided to remove any air entrapped during initial filling. Means are also provided to introduce feed liquid to be purified into the module, to release concentrated liquid from the module and to collect purified liquid from the interiors of the membrane elements.

In operation, feed liquid may be introduced into the module under pressure, e.g. several hundred pounds per square inch, and brine release is controlled by a back pressure regulator valve which releases brine while maintaining the desired high liquid pressure inside the module. Product liquid is collected for use, or transfer to storage.

Since the pressure is substantially equalized on the inside and the outside of the flow control tubes these do not need to be of heavy or strong construction. Therefore, they may be fabricated of light inexpensive plastic material and will function quite adequately to control the liquid flow over the membrane surfaces. The flow tubes may be of such internal diameter as to leave relatively narrow annular channels above the membrane surfaces so that velocity of the liquid passing through is relatively high, and turbulence or desirable laminar flow is insured. This will provide flow characteristics which will produce washing and cleaning effects as well as elimination of a high salt concentration boundary layer next to the membrane surface. Since the flow channels around the membrane elements will be of relatively small cross section the total volume flow need not necessarily be great, and pumping costs will be reasonable.

BRIEF DESCRIPTION OF THE DRAWINGS

In the accompanying drawings:

FIG. 6 shows a reverse osmosis system employing the module of this invention.

DESCRIPTION OF A PREFERRED EMBODIMENT

Figure 1:
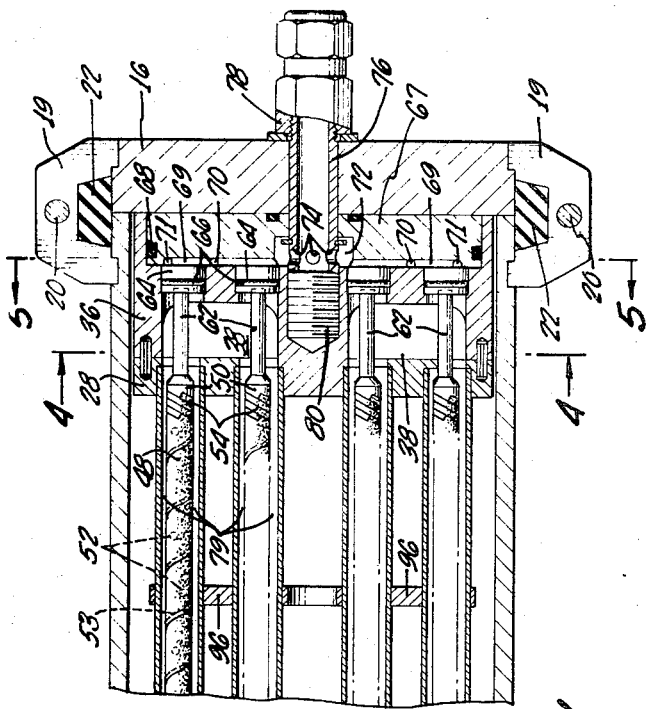
FIG. 1 shows a vertical central section taken longitudinally through a module embodying features of this invention.
Figure 2:
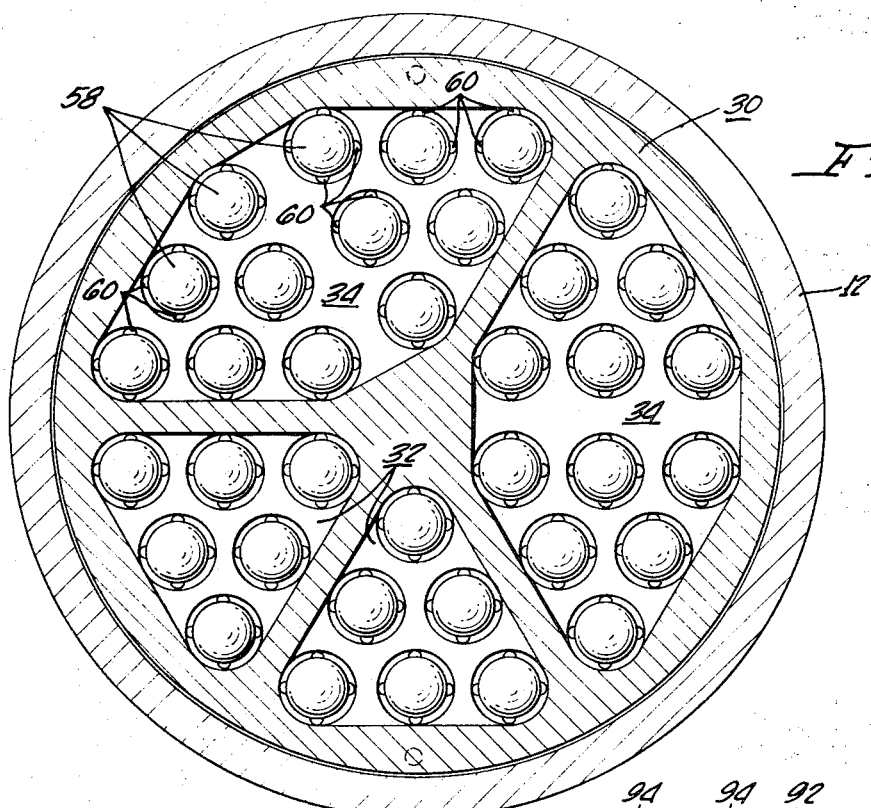
FIG. 2 shows a vertical cross section, somewhat enlarged, of the device of FIG. 1 taken along the line 2—2.
Figure 3:
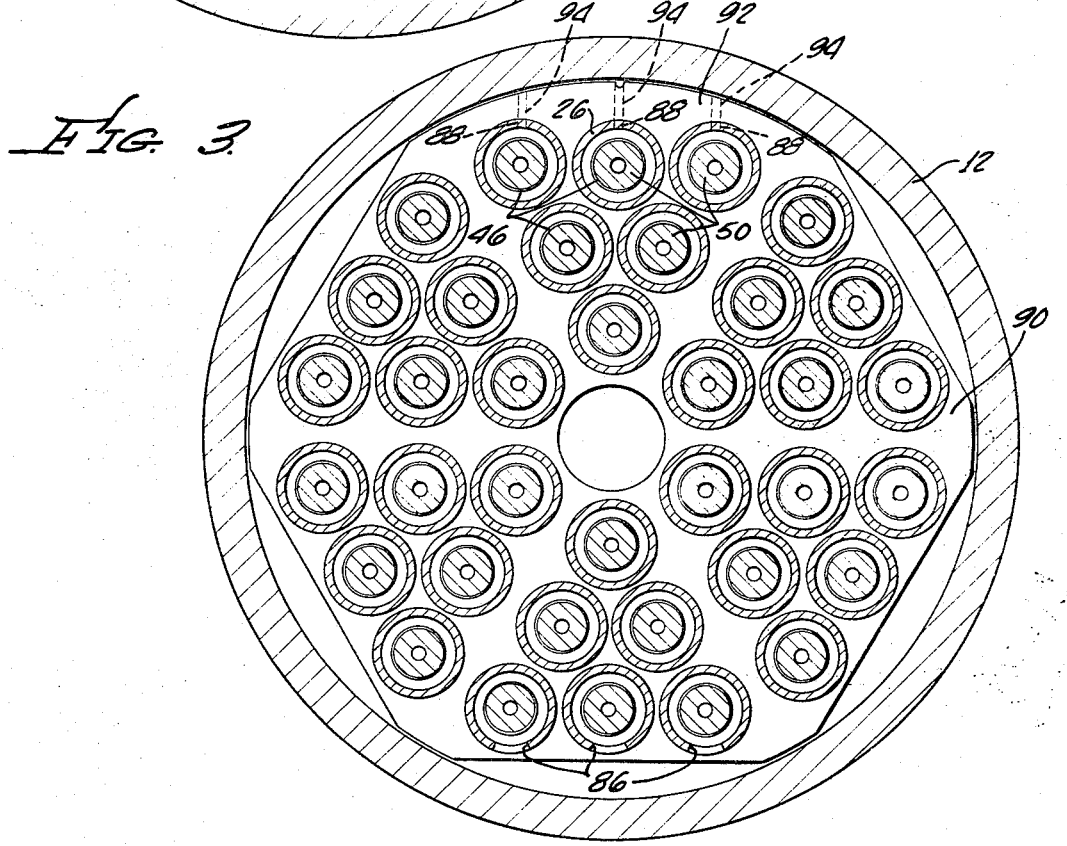
FIG. 3 shows a vertical cross section, somewhat enlarged, of the device of FIG. 1 taken along the line 3—3.
Figure 4:
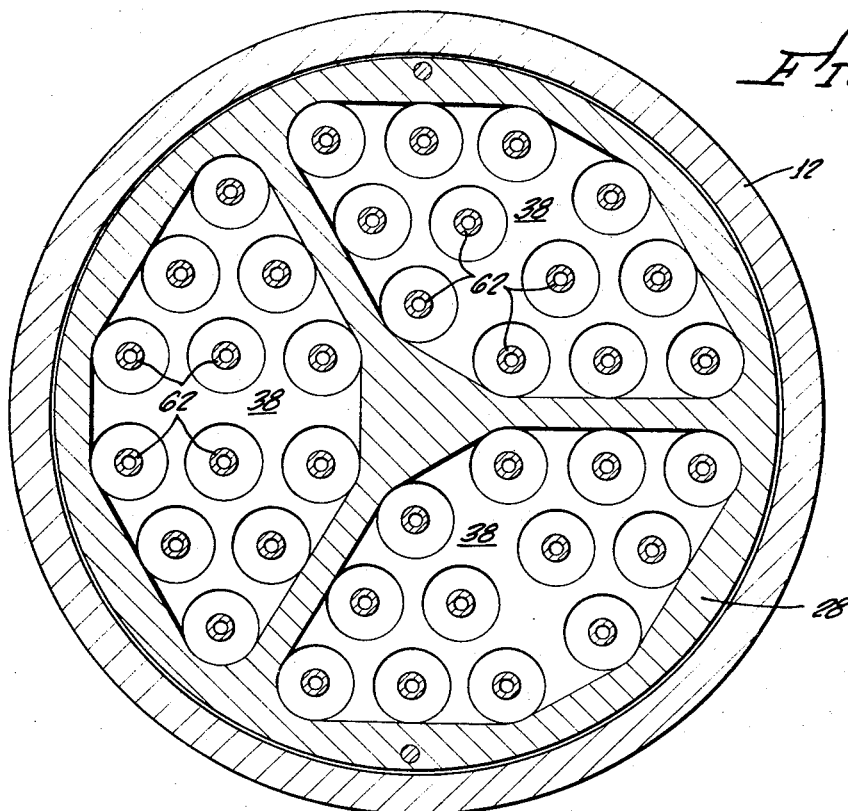
FIG. 4 shows a vertical cross section, somewhat enlarged, of the device of FIG. 1 taken along the line 4—4.

Referring now particularly to FIGS. 1-4, the module 10 comprises a pressure resistant container formed of tubular shell 12 having end plates 14 and 16 fastened thereto by couplings comprising split semicircular clamps 18 which are tightened together at flattened ends 19 by bolts 20 and when tightened compress heavy circular gasket 22 to form a high pressure seal at the junctures of the ends of tubular shell 12 and adjacent edges of end plates 14 and 16. Such couplings are available as commercial items, for example, those marketed under the trade name VICTAULIC couplings. Inside shell 10, at the left hand end looking at FIG. 1, is a support plate 24 in which are fastened one end of each of thin wall flow tubes 26. The other ends of flow tubes 26 are fastened into a second support plate 28. Flow tubes 26 and support plates 24 and 28 may conveniently be fabricated of plastic and these elements may be fastened together in sealing engagement by a suitable adhesive or solvent bonding agent. Attached to the back of support plate 24 in channel block 30 in which are located channels 32 and 34, channels 32 connecting the ends of selected flow tubes 26, as for example, groups of six, as shown, and channels 34 connecting other ends of selected flow tubes 26, for example, groups of twelve flow tubes, as will be seen more clearly in FIG. 2. In the embodiment illustrated a total of thirty six flow tubes 26 are shown arranged for flow purposes in six groups of six each. At the other end of module 10, channel block 36 is attached to the back of support plate 28 and in which are located three channels 38 of similar configuration and which connect groups of twelve flow tubes 26 as will be seen more clearly in FIG. 4.

Transfixing the left hand end plate 14 of module 10 (as shown in the drawings) are two threaded connectors 40 and 41 which may be of conventional type having internal tubular extensions 42 and 43 respectively which also penetrate channel plate 30 and communicate respectively with the two channels 32 being sealed in their passages through channel block 30 by "o" rings 44. Connector 40 may be connected to the liquid feed supply and the other connector 41 to the brine release system. The liquid flow through the six flow tube groups can be traced, for example, entering first through a connector 40 and its extension 42 in the left hand end of module 10, through a channel 32, through a group of six flow tubes 26, across through a channel 38 in the right hand end of the module 10, (see FIG. 4) back through another group of six flow tubes 26, then across through a channel 34 in the left hand end of module 10, (see FIG. 2) and across to the right hand end of the module 10 through six other flow tubes 26, then across another channel 38 to another group of six flow tubes 26, back again to the left hand end of the module 10 and crossing over through the other channel 34 to another group of six flow tubes 26, back again to the right hand end of the module 10, across the remaining channel 38 at this end and back through the remaining group of flow tubes 26 to the left hand end, through the other channel 32 and out through brine release or outlet connector 41.

Each of flow tubes 26 contains a membrane element 46, more particularly described in aforementioned U.S. Pat. No. 3,578,175, having a semipermeable membrane strip 48 helically wound around the outer surface of a tubular support 50 which is rendered permeable by spaced perforations 52. The overlapping edges 53 of the wound membrane strip 48 are sealed by a suitable solvent bonding agent or adhesive. The ends of semipermeable strip 48 are sealed to support 50 by adhesive tape wrapping 54. A layer of porous material such as of nylon cloth 56 may be helically wound underneath semipermeable membrane strip 48 to provide lateral transport of product water to perforations 52 in support tube 50. At one end each support tube 50 is closed by plug 58 which is sealed in place as by an adhesive and is provided with projecting spacers 60 to keep membrane element 46 centrally aligned in its flow tube 26 thus the membrane element and its surrounding flow tube will be concentric and this will result in the membrane surface of each membrane element and the interior surface of its individual surrounding flow tube being spaced apart a substantially uniform distance. At the other end each support tube 50 is capped with a bored extension 62 which is also sealed in place and which terminates in expanded diameter end 64 which is sealed to channel block 36 by "o" ring 66. It will be seen from the drawings that the plurality of membrane elements 46 and their surrounding flow tubes 26 are arranged in side-by-side relationship.

Figure 5:
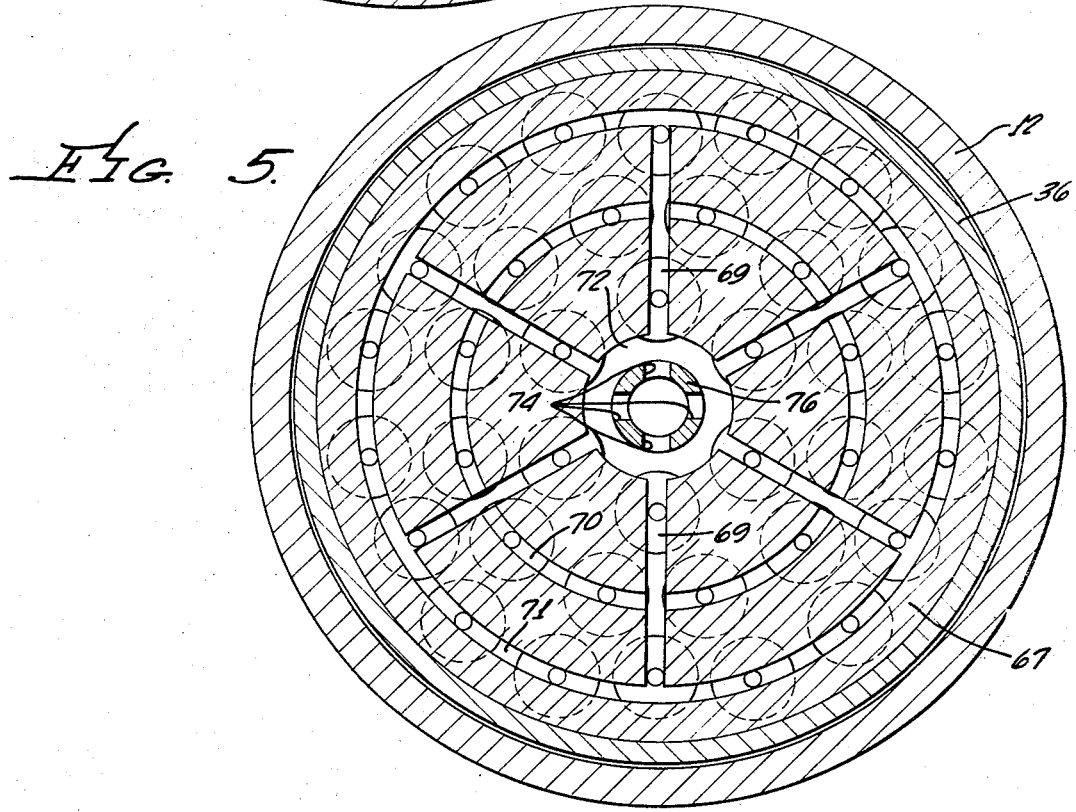
FIG. 5 shows a vertical cross section, somewhat enlarged, of the device of FIG. 1 taken along the line 5—5.

In a recess in the outer end of channel block 36 is collector block 67 sealed to the enclosing walls of channel block 36 by "o" ring 68 and in whose face adjacent the end of channel block 36 are radiating grooves 69 and connecting circular grooves 70 and 71 which communicate with the open bores in the expanded ends 64 of support tube extensions 62. These grooves are more clearly seen in FIG. 5. At the center, radiating grooves 69 communicate with a central bore 72 which communicates through ports 74 to the interior of the inwardly extending portion 76 of connector 78, which transfixes end plate 16. The interior end of connector extension 76 is threaded into channel block 36 as shown at 80 to provide support and alignment for this element inside the module. The flow of product water can be traced through the semipermeable membrane strips 48 wound on the outer surfaces of membrane elements 46, through the underlying fabric layer 56 to perforations 52 in support tubes 50 then through the interiors of support tubes 50, through their bored extensions 62 and out into grooves 69, 70 or 71 in the face of collector block 67. From these grooves product water flows into central bore 72, through ports 74 in extension 76 and may be withdrawn out of product water connector 78.

The interior surfaces of the flow tubes 26 are spaced apart from the outer membrane covered surfaces of membrane elements 46 a distance which will provide annular channels 79 of cross section to produce desired flow characteristics in the liquid being pumped through. For free flowing liquid applications the spacing or clearance may preferably be between 0.02 and 0.10 inch which will be sufficiently small to create turbulence or rapid flow velocity for desirable washing and cleaning effects and to maintain membrane operating efficiency by elimination or reduction of boundary layer effects. Spacing for purification of water, for example, may be about 0.03 inch to provide desirable flow conditions with reasonably low pumping rates. For purification or concentration processes when treating more viscous or solids-containing fluids, the channel 79 may be substantially larger.

The module 10 may be of convenient length. If for construction reasons the length is such that membrane elements 46 are fabricated as shorter tubes, these may be connected by a tubular connector 82 sealed into both adjacent ends of the support tubes 50, and may be equipped with projecting spacers 84 to maintain each element in central alignment within its flow tube at the joint location.

When supplying flow tubes 26 with feed liquid through connector 40, liquid passes also through port or bleed hole 86 preferably in the wall of a flow tube close to the feed liquid introduction means as inlet 40 and remote from the top of tubular shell 12 to fill the space between the exteriors of flow tubes 26 and the interior of shell 12. Means are provided to withdraw any air entrapped in this space which in the embodiment illustrated comprises a small port 88 in a flow tube adjacent the top of shell 12 and close to the concentrated liquid release means as outlet 41 and which will withdraw entrapped air into the liquid rapidly flowing through tube 26. The size of the port in the flow tube adjacent the top of the pressure resistant container is less than that of the port in the flow tube remote from the top of the pressure resistant container. Preferably the port in the flow tube adjacent the top of the pressure resistant container is of cross sectional area from one half to 1/25 of that of the port in the flow tube remote therefrom. Preferably port 88 is connected to means which will reach almost to the top of the interior of the module. This is accomplished, which will be seen more clearly in FIG. 3, in the embodiment illustrated, by provision of spacer 90, which maintains flow tubes 26 in spaced and preferably parallel relationship, with an upper projection 92 having a bore 94 with its opening close to the under surface of shell 12 and communicating with inlet 88 so that entrapped gas may be sucked out from the extreme top of the module interior. If desired several lower flow tubes which are close to the feed liquid inlet means 40 are constructed with ports 86 for example three in the example illustrated, and three of the flow tubes adjacent the top of the pressure resistant container and which are close to brine outlet 41 will be constructed with smaller withdrawal ports as will be seen also in FIG. 3. At other locations along the length of flow tubes 26 are support and maintenance of spaced relationship may be required another spacer such as at 96 may be provided. The location of ports 86 and 88 with respect to the feed liquid inlet and brine outlet is important so that the incoming liquid is passed through a port or ports 86 close to or near the point of entry into the module so that the space between the outside of flow tubes 26 and the interior of module shell 10 may be filled as rapidly as possible with inflowing liquid. Port 88 should be located in a flow tube or flow tubes close to or near the brine outlet of the module so that entrapped air may be withdrawn as the brine flows out of the flow tubes.

Operation of a module according to this invention in a reverse osmosis process is illustrated in FIG. 6. Feed liquid, which for example may be brackish water, is connected to the inlet of high pressure pump 98 from which it is transferred by pipe 100 to connector 40 which is feed liquid inlet. The other connector 41, the brine outlet, is connected by pipe 102 to pressure regulating valve 104. This valve maintains operating pressure of the liquid in module 10 to provide conditions for purification of the feed liquid by reverse osmosis, at the same time it releases a flow of brine to the atmosphere which may be discarded to waste or sewer or treated for recovery of concentrated solids. Purified water is released from module 10 through connector 78 to which is connected pipe 106 which may be used to transfer the purified product to use or storage. When the high pressure pump 98 is first started with feed and brine connections as described, the feed liquid enters the module through the inlet connector 40 then through the first six connected flow tubes and around the membrane elements enclosed therein. The liquid flow follows the path described previously. At the same time feed liquid passes through ports 86 in the bottom of three lower tubes to fill the spaced between the outer surfaces of the flow tubes 26 and the interior surface of the module shell 12 with feed liquid. It is best to start the feed liquid flow slowly so that as the pressure rises in the system the space inside module 10 becomes filled with feed liquid and any entrapped air is withdrawn through ports 88 into upper flow tubes. Thus when full operating pressure is reached, which may be of the order of several hundred pounds per square inch, or more, the space inside the module outside the flow tubes is filled with feed liquid at substantially the same pressure as that inside the flow tubes.

Operating at 450 psig a twelve foot module of the type illustrated equipped with membrane elements helically wound with cellulose acetate membranes produced over 800 gallons per day of purified water of 24 ppm TDS from feed water containing 808 ppm TDS.

With pressure substantially equalized inside and out, the flow tubes fulfill their basic function which is to guide and control the liquid flow over the membrane surfaces, without being subject to appreciable differential pressure stresses. This feature of the invention makes possible very efficient flow path design using light and inexpensive flow guide tubes. The annular liquid flow channels between the membrane surfaces and the interiors of the flow tubes can be of dimensions to provide high velocity flow or turbulence so that efficient washing and cleaning action and elimination of deleterious boundary layer conditions may be obtained without excessive pumping costs.

We claim:

1. A module, useful in systems for treatment of a liquid by a membrane process, comprising a pressure resistant container, a plurality of membrane support elements having semipermeable membrane covered outer surfaces in side-by-side relationship in said container, means for introducing feed liquid under pressure into said container, means for releasing concentrated liquid from said container, and means for collecting purified liquid from said membrane elements, in which the improvements comprise:

a. an individual flow tube supported in said container and surrounding each of said membrane elements, said flow tube having its interior surface spaced apart a substantially uniform distance from the membrane covered surface of said membrane element;

b. means for introducing feed liquid into one end of the channels formed between the interior surfaces of said flow tubes and the membrane covered surfaces of said membrane elements;

c. means for releasing concentrated liquid from the other end of said channels; and d. means for introducing feed liquid into the space between the outer surfaces of said flow tubes and the inner surface of said pressure resistant container, said feed liquid being so introduced into said space at substantially the same pressure as it is introduced into said channels between the interior surfaces of said flow tubes and the membrane covered surfaces of said membrane elements.

2. A module according to claim 1 in which said interior surfaces of said flow tubes and said membrane covered surfaces of said membrane elements are spaced apart between about 0.02 and 0.10 inch.

3. A module according to claim 2 in which the said interior surfaces of said flow tubes and said membrane covered surfaces of said membrane elements are spaced apart about 0.03 inch.

4. A module according to claim 1 in which:

a. at least one of said flow tubes remote from the top of said pressure resistant container and close to said feed liquid introduction means has a port in its wall to permit transfer of feed liquid from its interior into the space between the outer surfaces of said flow tubes and the interior surface of said pressure resistant container; and, b. at least one of said flow tubes adjacent to the top of said pressure vessel and close to said concentrated liquid release means has a port in its upper surface for withdrawal of air;

c. said port in said flow tube adjacent the top of said pressure resistant container being of cross sectional area less than the cross sectional area of the port in said flow tube remote from the top of said pressure resistant container.

5. A module according to claim 4 in which the cross sectional area of the port in the flow tube adjacent the top of said pressure resistant container is between one half and one twentyfifth of the cross sectional area of the port in said flow tube remote from the top of said pressure resistant container.

6. A module according to claim 4 in which three flow tubes remote from the top of said pressure resistant container have ports to permit transfer of feed liquid from their interior into the space between the outer surfaces of said flow tubes and the interior surfaces of said pressure resistant container, and three flow tubes adjacent the top of said pressure resistant container have ports for withdrawal of air.

7. A module according to claim 4 in which a block is arranged above said port in said flow tube adjacent the top of said pressure resistant container, said block having a bore communicating with said port in said flow tube and said bore having an opening close to the under surface of the top of said resistant container.

8. A module according to claim 7 in which said block is formed as the top part of a spacer maintaining said flow tubes in a spaced relationship.

* * * * *